United States Patent [19]

Bullock et al.

[11] 3,867,384
[45] Feb. 18, 1975

[54] 2-AMINO-4(3H)-QUINAZOLINONES

[76] Inventors: Greg A. Bullock, 2225 Patwynn Rd.;
Patrick J. Sheeran, 2707 W. Lock Dr., both of Wilmington, Del. 19810

[22] Filed: Sept. 1, 1972

[21] Appl. No.: 285,616

[52] U.S. Cl..... 260/256.4 Q, 260/256.5 R, 424/251
[51] Int. Cl............................................ C07d 51/48
[58] Field of Search............... 260/256.4 Q, 256.5 R

[56] References Cited
UNITED STATES PATENTS
3,509,141   4/1970   Walker ........................... 260/247.1
3,525,748   8/1970   Pesson ........................... 260/256.4

OTHER PUBLICATIONS
Grout et al., J. Chem. Soc., 1960, 3540–3545.

*Primary Examiner*—G. Thomas Todd

[57] ABSTRACT

Novel 2-amino-4(3H)-quinazolinones are good fungicides, especially effective against powdery mildew. These compounds can be made from the corresponding 2-chloro- or 2-alkylthio-4(3H)-quinazolinones by treatment with an amine.

3 Claims, No Drawings

2-AMINO-4(3H)-QUINAZOLINONES

BACKGROUND OF THE INVENTION

This invention relates to certain 2-amino-4(3H)-quinazolinones and to their use as fungicides.

The copending application Ser. No. 121,143 of Greg A. Bullock discloses a group of substituted 4(3H)-quinazolinones and quinazolinethiones having the following Formula (1).

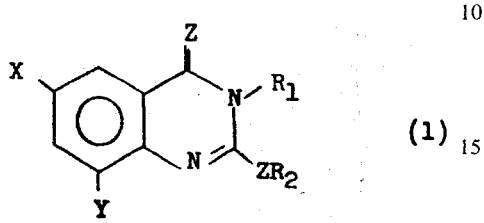

in which various substituents can be present in the $R_1$, $R_2$, X and Y locations, and Z can be either oxygen or sulfur. A typical compound of the application Ser. No. 121,143 is for example, 6-chloro-3-ethyl-2-methylthio-4(3H)-quinozolinone. All those compounds are good fungicidal or fungistatic agents. They are effective, for example, against powdery mildew.

An effective plant fungicide should be able to control fungi when applied to plants even at low rates and should be stable enough to withstand possibly adverse atmospheric conditions. A search for more active and more stable fungicidal agents is, therefore, a continuing effort.

SUMMARY OF THE INVENTION

According to this invention, there is now provided a novel class of 2-aminoquinazolinones, which have outstanding fungicidal properties. These compounds can be represented by the following Formula (2).

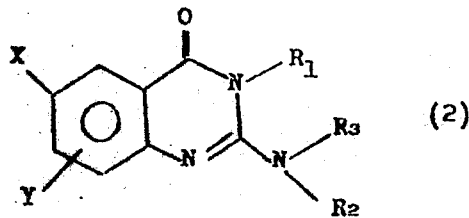

wherein
$R_1$ is a $C_1-C_{12}$ alkyl, a $C_3-C_8$ alkenyl, a $C_3-C_4$ alkynyl, a $C_3-C_8$ cycloalkyl, a $C_5-C_8$ cycloalkenyl, a $C_4-C_9$ cycloalkylalkyl, a $C_7-C_9$ phenylalkyl;
a $C_1-C_6$ alkyl substituted with 1–3 chlorine atoms, a bromine atom, 1–7 fluorine atoms,
a $C_1-C_4$ alkoxyl, hydroxyl, a cyano group, carboxyl, or a $C_2-C_3$ alkoxycarbonyl; or
a $C_5-C_8$ cycloalkyl substituted with 1–2 methyl groups or chlorine, bromine, or fluorine atoms;
$R_2$ is hydrogen, a $C_1-C_8$ alkyl, a $C_3-C_4$ alkenyl, a $C_3$ $-C_4$ alkynyl, methoxy, a $C_1-C_6$ acyl, a $c_2-C_5$ alkoxycarbonyl, benzyl, phenyl;
a $C_1-C_6$ alkyl substituted with 1–3 chlorine atoms, a bromine atom, 1–7 fluorine atoms,
a $C_1-C_4$ alkoxyl, hydroxyl, a cyano group, carboxyl, or a $C_2-C_3$ alkoxycarbonyl;
a $C_1-C_2$ alkylthio group substituted with 1–4 chlorine or fluorine atoms; or the radical

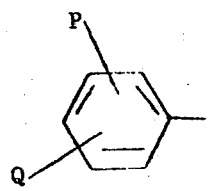

wherein
P is a halogen, a $c_1-C_4$ alkoxyl, hydroxyl, a $C_1-C_4$ alkyl, a $C_2-C_5$ alkoxycarbonyl, or carboxyl; and
Q is hydrogen, chlorine, bromine, or a $C_1-C_4$ alkyl;
$R_3$ is hydrogen or a $C_1-C_4$ alkyl; and
each of X and Y independently is hydrogen, a halogen, a $C_1-C_4$ alkyl, a $C_1-C_4$ alkoxyl, a nitro group, or a cyano group;
provided that
a. only one of X and Y can be hydrogen, fluorine, iodine, alkyl, alkoxyl, nitro group, or cyano group; and
b. $R_1$, $R_2$, and $R_3$ taken together contain at most 18 carbon atoms.

DETAILED DESCRIPTION OF THE INVENTION

The most active, and the preferred, 2-aminoquinazolinones of Formula (2) are those in which
$R_1$ is allyl or a $C_1-C_3$ alkyl;
$R_2$ is allyl, a $C_1-C_6$ alkyl, or phenyl;
$R_3$ is hydrogen;
X is a halogen; and
Y is hydrogen.

Preferred alkyl groups in the $R_1$ position thus are methyl, ethyl, propyl, and isopropyl; preferred alkyl groups in the $R_2$ position include methyl, ethyl, propyl, isopropyl, butyl, isobutyl, sec-butyl, tert-butyl, as well as straight-chain and branched isomers of pentyl and hexyl.

The quinazolinones of Formula (2) are prepared by either one of the method outlined below.

One method of preparation is by treatment of a 2-alkylthio-4(3H)-quinazolinone with an excess of the amine at 150°–175°C (Equation 1).

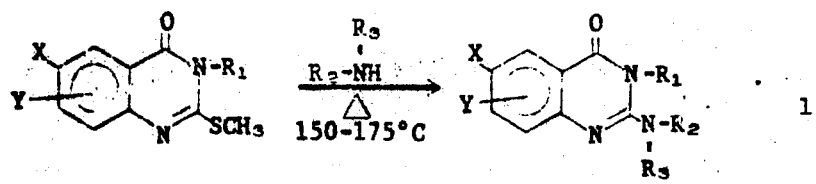

The second method of preparation of the compounds of Formula (2) is by treatment of the 2-chloro-4(3H)-quinazolinone with two equivalents of the appropriate amine at a temperature between 60–120°C, with or without solvent (Equation 2).

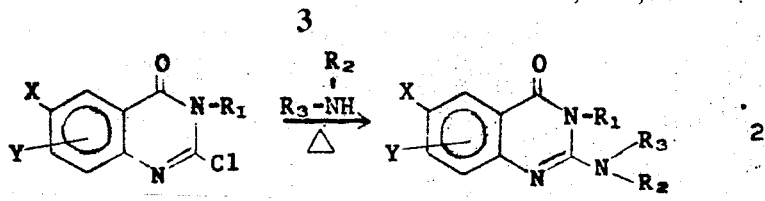

The 2-chloro-4(3H)-quinazolinones are prepared by either one of the two methods shown below. The first method has been described in the literature, C.A., Vol. 65, 15400b, British Pat. No. 1,038,729 (Equation 3).

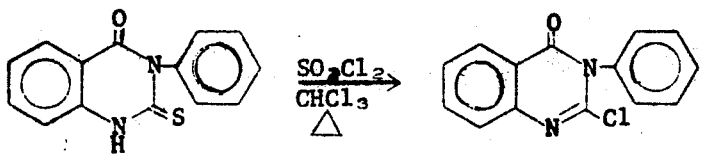

The second method is shown in Equation 4 and is a general preparation of 2-chloro-4(3H)-quinazolinones.

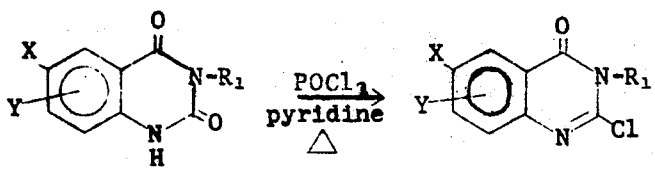

The preparation of representative 2-amino-4(3H)-quinazolinones is illustrated by the following examples wherein all parts, proportions, and percentages are by weight unless indicated otherwise.

EXAMPLE 1

A stirred solution of 350 ml of phosphorus oxychloride, 50 parts of pyridine and 124 parts of 3-allyl-6-bromo-2,4(1H, 3H)-quinazolinedione is refluxed for 20 hours. The phosphorus oxychloride is evaporated under a vacuum and the residue hydrolyzed in 1.5 l. of ice water.

The solid is dried and extracted with 3 × 300 ml of hot hexane. The hexane solution is cooled and filtered to give 91 parts of 2-chloro-3-allyl-6-bromo-4(3H)-quinazolinone, m.p. 79°–81°C. ir 1,700 cm$^{-1}$ (C=O).
Anal. Calc'd. for $c_{11}H_8ClBrN_2O$: C, 44.10; H, 2.67; N, 9.37.
Found: C, 44.13; H, 2.87; N, 9.09.

EXAMPLE 2

A stirred solution of 300 ml of phosphorus oxychloride, 40 parts of pyridine and 90 parts of 3-methyl-6-chloro-2,4(1H, 3H)-quinazolinedione is heated at reflux for 72 hours. The phosphorus oxychloride is evaporated under a vacuum and the residue poured into 1 liter of ice water.

The solid is filtered off and recrystallized from carbon tetrachloride to give 64 parts of 2,6-dichloro-3-methyl-4(3H)-quinazolinone, m.p. 152°–154°C., ir 1,680 cm$^{-1}$ (C = O).

EXAMPLE 3

A. Nine parts of 5-chloroanthranilic acid is added to a stirred solution of five parts of allyl isothiocyanate in 50 parts of ethanol. The suspension is stirred and refluxed for four hours, cooled, and the precipitated thioquinazolinedione is collected by filtration and air-dried. Five parts of substantially pure 6-chloro-3-allyl-2-thio-4(3H)-quinazolinedione is obtained. All of this compound is combined with one-half part of sodium hydride in 60 parts of tetrahydrofuran and stirred and refluxed for 1 hour. Three parts of methyl iodide is added and the suspension is stirred and refluxed for two hours. The solvent is then evaporated to a semisolid under reduced pressure. Dilution with 8 parts of water produces a white solid which is collected by filtration, washed well with water and air-dried. This compound is then recrystallized from a mixture of ethanol and water to give four parts of pure 2-methylthio-3-allyl-6-chloro-4(3H)-quinazolinone, melting at 105.5° – 107.5°C.

B. A dispersion of eight parts of 2-methylthio-3-allyl-6-chloro-4(3H)-quinazolinone in 25 parts of aniline is heated at 170°C for 16 hours. The aniline solution is then poured into 75 ml of ethanol and 50 ml of water is added. After filtration and recrystallization from acetonitrile, there is obtained 3.5 parts of 2-anilino-3-allyl-6-chloro-4(3H)-quinazolinone, m.p. 148°–150°C.
Anal. calc'd. for $c_{17}H_{14}ClN_3O$: C, 65.04; H, 4.49; N, 13.45.
Found: C, 65.20; H, 4.50; N, 13.68. ir 1,670 cm$^{-1}$ (C=O), 3,500 cm$^{-1}$ (N—H).

EXAMPLE 4

A solution of 3.8 parts of 2,6-dichloro-3-allyl-4(3H)-quinazolinone in 75 ml of dry tetrahydrofuran is treated with 3.2 parts of p-toluidine and refluxed for 24 hours. The solid is filtered off and the solvent evaporated under a vacuum. The solid residue is recrystallized from benzene to give 2.2 parts of 2-(4-methylanilino)-3-allyl-6-chloro-4(3H)-quinazolinone, m.p. 132°–134°C.
Anal. Calc'd for $C_{18}H_{16}ClN_3O$: C, 66.41; H, 4.92; N, 12.92.
Found: C, 66.88; H, 5.02; N, 12.42. ir 1,670 cm$^{-1}$ (C=O), 3,400 cm$^{-1}$ (N—H).

EXAMPLE 5

A solution of 4.5 parts of 2-chloro-3-allyl-6-bromo-4(3H)-quinazolinone in 75 ml of dry tetrahydrofuran is treated with 2.8 parts of aniline and refluxed for 12 hours. The solid (aniline hydrochloride) is filtered off and the filtrate evaporated under a vacuum. The solid residue is recrystallized from ethanol to give 2.2 parts of 2-anilino-3-allyl-6-bromo-4(3H-quinazolinone, m.p. 152°–155°C.

Anal. Calc'd. for $C_{17}H_{14}BrN_3O$: C, 57.30; H, 3.93; N, 11.80.
Found: C, 57.62; H, 4.13; N, 11.57. ir 1,650 cm$^{-1}$ (C=O), 3,400 cm$^{-1}$ (N—H).

EXAMPLE 6

A solution of 4.5 parts of 2-chloro-3-allyl-6-bromo-4(3H)-quinazolinone in 75 ml of dry tetrahydrofuran is treated with 1.7 part of allylamine and refluxed for one hour. The reaction mixture is cooled and filtered. The filtrate is evaporated under a vacuum and the residue recrystallized from ethanol to give 2.9 parts of 2-allylamino-3-allyl-6-bromo-4(3H)-quinazolinone, m.p. 97°–99°C.
Anal. Calc'd. for $C_{14}H_{14}BrN_3O$: C, 52.50; H, 4.37; N, 13.10.
Found: C, 52.50; H, 4.34; N, 13.08. ir 1,660 cm$^{-1}$ (C=O), 3,400 cm$^{-1}$ (N—H).

EXAMPLE 7

A solution of 5.5 parts of 2-chloro-3-allyl-6-bromo-4(3H)-quinazolinone in 150 ml of dry tetrahydrofuran is treated with 5.0 parts of octylamine and refluxed for two hours. The reaction mixture is cooled and filtered. The filtrate is evaporated under a vacuum and the oily residue is dissolved in 50 of methylene chloride. The methylene chloride layer is extracted twice with 50 ml of water. The organic layer is dried over magnesium sulfate, filtered and evaporated under a vacuum to give 3.5 parts of oily 2-octylamino-3-allyl-6-bromo-4(3H)-quinazolinone. ir 1,650 cm$^{-1}$ (C=O), 3,400 cm$^{-1}$ (N—H).

The following 2-amino-4(3H)-quinazolinones can be prepared by the procedure of Example 5, starting with the corresponding 2-chloro-4-(3H)-quinazolinone and replacing aniline with the appropriate amine. In the cases where the product is an oil, isolation by the procedure of Example 7 can be utilized.

TABLE I 2-methylamino-3-methyl-6-chloro-4(3H)-quinazolinone
2-allylamino-3-methyl-6-chloro-4(3H)-quinazolinone
2-(buten-2-ylamino)-3-methyl-6-chloro-4(3H)-quinazolinone
2-propargylamino-3-methyl-6-chloro-4(3H)-quinazolinone
2-(butyn-2-ylamino)-3-methyl-6-chloro-4(3H)-quinazolinone
2-amino-3-(butoxyethyl)-4-(3H)-quinazolinone
2-octylamino-3-chloromethyl-6-chloro-4(3H)-quinazolinone
2-(2,3,4-trichlorohexylamino)-3-cyanomethyl-6-chloro-4(3H)-quinazolinone
2-(2-bromoethylamino)-3-(3-fluoropropyl)-6-chloro-4(3H)-quinazolinone
2-(2-chloroethylamino)-3-(3-methoxypropyl)-6-chloro-4(3H)-quinazolinone
2-methoxymethylamino-3-heptafluoropropyl-6-chloro-4(3H)-quinazolinone
2-(2-butoxyethylamino)-3-(2-fluoroethyl)-6-chloro-4-(3H)-quinazolinone
2-heptafluoropropylamino-3-carboxymethyl-6-chloro-4-(3H)-quinazolinone
2-(3-fluoropropylamino)-3-(butyn-2-yl)-6-chloro-4(3H)-quinazolinone
2-benzylamino-3-carbomethoxymethyl-6-chloro-4(3H)-quinazolinone
2-methoxyamino-3-carbethoxymethyl-6-chloro-4(3H)-quinazolinone
2-(4-fluoroanilino)-3-(3-methylcyclopentyl)-6-chloro-4(3H)-quinazolinone
2-(2-hydroxyethylamino)-3-methyl-6-chloro-4(3H)-quinazolinone
2-(2-cyanoethylamino)-3-(2-bromoethyl)-6-chloro-4(3H)-quinazolinone
2-carboxymethylamino-3-methyl-6-chloro-4(3H)-quinazolinone
2-carbomethoxymethylamino-3-methyl-6-chloro-4(3H)-quinazolinone
2-carbethoxymethylamino-3-methyl-6-chloro-4(3H)-quinazolinone
2-anilino-3-(2,3,4-trichlorohexyl)-6-chloro-4-(3H)-quinazolinone
2-(4-methylanilino)-3-methyl-6-chloro-4-(3H)-quinazolinone
2-(2,4-dimethylanilino)-3-methyl-6-chloro-4(3H)-quinazolinone
2-(3,5-dichloroanilino)-3-methyl-6-chloro-4-(3H)-quinazolinone
2-(4-iodoanilino)-3-(3,4-dichlorocyclooctyl)-6-chloro-4(3H)-quinazolinone
2-(4-methoxyanilino)-3-hydroxymethyl-6-chloro-4(3H)-quinazolinone
2-(4-butylanilino)-3-methyl-6-chloro-4(3H)-quinazolinone
2-(4-butoxyanilino)-3-methyl-6-chloro-4(3H)-quinazolinone
2-(4-hydroxyanilino)-3-methyl-6-chloro-4(3H)-quinazolinone
2-(3,5-dibromoanilino)-3-methyl-6-chloro-4(3H)-quinazolinone
2-(4-carboxyanilino)-3-methyl-6-chloro-4(3H)-quinazolinone
2-(4-carbomethoxyanilino)-3-methyl-6-chloro-4(3H)-quinazolinone
2-(3,4-dibutylanilino)-3-methyl-6-chloro-4(3H)-quinazolinone
2-(4-bromoanilino)-3-benzyl-6-chloro-4(3H)-quinazolinone
2-(4-methoxy-2-methylanilino)-3-methyl-6-bromo-4(3H)-quinazolinone
2-anilino-3-(3-bromocyclopentyl)-6-bromo-4(3H)-quinazolinone
2-methylamino-3-(4-chlorocyclohexyl)-6-bromo-4(3H)-quinazolinone
2-(4-chloro-2-bromoanilino)-3-methyl-6-bromo-4(3H)-quinazolinone
2-allylamino-3-(3,4-dibromocyclohexyl)-6-iodo-4(3H)-quinazolinone
2-(4-methoxy-2-methylanilino)-3-(3-phenylpropyl)-6-iodo-4(3H)-quinazolinone
2-methylamino-3-(6-hydroxyhexyl)-6-iodo-4(3H)-quinazolinone
2-allylamino-3-cyclooctylmethyl-6-fluoro-4(3H)-quinazolinone
2-anilino-3-methyl-6-fluoro-4(3H)-quinazolinone
2-allylamino-3-methyl-6,8-dibromo-4(3H)-quinazolinone
2-anilino-3-methyl-6,8-dichloro-4(3H)-quinazolinone
2-anilino-3-cyclooctyl-6-chloro-4(3H)-quinazolinone
2-(4-chloro-2-methylanilino)-3-propargyl-6-chloro-4-(3H)-quinazolinone 2-allylamino-3-(octen-7-yl)-6-chloro-4(3H)-quinazolinone
2-anilino-3-(2,4-difluorocyclohexyl)-6-chloro-4(3H)-quinazolinone
2-anilino-3-(cyclopenten-3-yl)-6-chloro-4(3H)-quinazolinone
2-anilino-3-cyclopropylmethyl-6-chloro-4(3H)-quinazolinone
2-anilino-3-(3,4-dimethylcyclopentyl)-6-chloro-4(3H)-quinazolinone
2-allylamino-3-ethyl-6-chloro-4(3H)-quinazolinone
2-allylamino-3-allyl-6-nitro-4(3H)-quinazolinone
2-(4-carbobutoxyanilino)-3-allyl-6-methyl-4(3H)-quinazolinone
2-allylamino-3-methyl-6-butyl-4(3H)-quinazolinone
2anilino-3-methyl-6-methoxy-4(3H)-quinazolinone
2-allylamino-3-(4-fluorocyclohexyl)-6-butoxy-4(3H)-quinazolinone
2-allylamino-3-allyl-6-cyano-4(3H)-quinazolinone
2-anilino-3-allyl-5,6-dichloro-4(3H)-quinazolinone
2-allylamino-3-allyl-6,7-dichloro-4(3H)-quinazolinone
2-allylamino-3-dodecyl-6-methoxy-8-chloro-4(3H)-quinazolinone
2-anilino-3-cyclopropyl-6-methyl-8-bromo-4(H)-quinazolinone
2-anilino-3-(cycloocten-2-yl)-6-cyano-4(3H)-quinazolinone
2-diethylamino-3-allyl-6-chloro-4(3H)-quinazolinone
2-dibutylamino-3-allyl-6-carboxy-4(3H)-quinazolinone
2-N-methylanilino-3-allyl-6-butoxy-4(3H)-quinazolinone
2-dimethylamino-3-allyl-6-bromo-4(3H)-quinazolinone
2-anilino-3-cyclohexylmethyl-6-bromo-4(3H)-quinazolinone
2-N-methyl-N-propargylamino-3-allyl-6-iodo-4(3H)-quinazolinone The 2-acylamino-4(3H)-quinazolinones and 2-haloalkyl-thioamino-4(3H)-quinazolinones are prepared by treatment of the 2-amino-4-(3H)-quinazolinones with an equivalent of the acid chloride or the haloalkylsulfenyl chloride, respectively, in an organic solvent such as tetrahydrofuran or acetonitrile. A tertiary organic base such as pyridine or triethylamine can be used as an acid acceptor.

The 2-acylamino-4(3H)-quinazolinones are also prepared by treatment of the 2-chloro-4(3H)-quinazolinones with an equivalent of the lithio-amide in tetrahydrofuran.

EXAMPLE 9

Ethyl carbamate (1.8 parts) is treated with a suspension of one part of sodium hydride (50 percent oil dispersion) in 100 ml of dry tetrahydrofuran and stirred at room temperature for 2 hours. A solution of five parts of 2,6-dichloro-3-allyl-4(3H)-quinazolinone in 15 ml of dry tetrahydrofuran is added dropwise. The reaction is stirred at room temperature for four hours, filtered and the solvent evaporated under a vacuum.

The oily residue is chromatographed on Florisil with benzene:chloroform (1:1) as the eluant. There is obtained 0.2 parts of 2-carbethoxyamino-3-allyl-6-chloro-4(3H)-quinazolinone, m.p. 157°–159°C. ir 1,700 cm$^{-1}$ ($CO_2Et$(, 1640 cm$^{-1}$ (amide C=O). NMR 12.86$\delta$ 1H (s), 7–8.2$\delta$, 3H (m), 4.6–6.2$\delta$ 5H (m), 4.2$\delta$ 2H (q), 1.3$\delta$3H (t).

Table II lists some additional substituted 4(3H)-quinazolinones that can be prepared by either one of the two methods above.

TABLE II 2-formylamino-3-allyl-6-chloro-4(3H)-quinazolinone
2-hexanoylamino-3-methyl-6-bromo-4(3H)-quinazolinone
2carbomethoxyamino-3-allyl-6-chloro-4(3H)-quinazolinone
2-carbobutoxyamino-3-allyl-6-chloro-4(3H)-quinazolinone
2-perchloromethylthioamino-3-allyl-6-chloro-4(3H)-quinazolinone
2-tetrafluoroethylthioamino-3-allyl-6-chloro-4(3H)-quinazolinone
2-tetrachloroethylthioamino-3-allyl-6-chloro-4(3H)-quinazolinone
2-(2-chloroethylthioamino)-3-allyl-6-bromo-4(3H)-quinazolinone
2-(2-fluoroethylthioamino)-3-allyl-6-chloro-4(3H)quinazolinone The compounds of Formula (2) possess outstanding activity when employed to prevent or mitigate damage to plants of fungi. The compounds are particularly effective against the powdery mildew fungi, Erysiphaceae, and control a wide variety of powdery mildew fungus diseases of foliage, fruit and stems of growing plants without damage to the host.

The compounds of this invention provide protection from damage caused by powdery mildew fungi when applied to the proper locus by the methods described hereinafter and at a sufficient rate to exert the desired fungicidal effect. They are especially suited for the protection of living plants such as fruit-bearing trees, vegetable crops, horticultural crops (including ornamentals, small fruits and berries), fiber crops, grain and seed crops, sugar beets, forage and hay crops, beans, peas, soybeans, turf and pasture.

Living plants may be protected from fungi by applying one or more of the compounds of this invention to the soil in which they are growing or in which they may subsequently be seeded or planted; or to seeds, tubers, bulbs or other plant reproductive parts prior to planting; as well as to foliage, stems and fruit of the living plant. Living plants can also be protected by dipping the root system or physically injecting the chemical or chemicals into roots or stems.

Soil applications are made from dusts, granules, pellets, slurries or solution. Rates for application of the compounds of this invention to soil in which plants are or will be growing range from 1 to 100 parts per million by weight of the soil in which the roots are or will be growing. Rates for dip applications to roots or for injection into roots or stems of living plants are in the range of 1 to 1,000 parts per million of active ingredient in water or other liquid carrier.

Rates for application to seeds, tubers, bulbs or other plant reproductive parts, range from 10 to 1,000 grams of active compound of this invention per 50 kilograms of planting material treated.

Rates for application of the compounds of this invention to foliage, stems and fruit of living plants range from 0.1 to 10 kilograms of active ingredient per hectare. The optimum amount within this range depends upon a number of variables which are well known to those skilled in the art of plant protection. These variables include, but are not limited to, the disease to be controlled, weather conditions expected, the type of crop, stage of development of the crop, and the interval between applications. Applications within the range given may need to be repeated one or more times at intervals of 1 to 60 days. Applications are made from dusts, slurries or solutions.

The compositions of this invention can contain, in addition to the active ingredient of this invention, conventional insecticides, miticides, bactericides, nematicides, fungicides, or other agricultural chemicals such as growth modifiers, fertilizers and the like, so the compositions can serve useful purposes in addition to the control of fungi. The proper choice of amounts is readily made by one skilled in the art of protecting plants from pest depredations.

The outstanding control of powdery mildew by the compounds of this invention is illustrated by greenhouse preventive tests. The compounds listed in Table III, below, were sprayed in water suspensions on cucumber seedlings to the point of run-off. Treated seedlings were dried and inoculated with conidia of the fungus, *Erysiphe cichoracearum*. After 10 days incubation in a greenhouse, seedlings which were not treated were 85 to 100 percent covered with powdery mildew. Disease control readings were made by estimating the percentage of leaf surface free of disease.

TABLE III

| Compound | Percent Powdery Mildew Control | |
|---|---|---|
| | 16 PPM | 3 PPM |
| 2-anilino-3-allyl-6-chloro-4(3H)-quinazolinone | 100 | 100 |
| 2-(4-methylanilino)-3-allyl-6-chloro-4(3H)-quinazolinone | 100 | 100 |
| 2-anilino-3-allyl-6-bromo-4(3H)-quinazolinone | 100 | 100 |
| 2-allylamino-3-allyl-6-bromo-4(3H)-quinazolinone | 99 | 93 |
| 2-cyclohexylamino-3-allyl-6-bromo-4(3H)-quinazolinone | 100 | 97 |
| 2-propylamino-3-allyl-6-bromo-4(3H)-quinazolinone | 99 | 98 |
| 2-carbethoxyamino-3-allyl-6-chloro-4(3H)-quinazolinone | 100 | 100 |

The systemic activity of the compounds of this invention is demonstrated in a soil drench test on potted cucumber seedlings. Suspensions of the compounds listed in Table IV, below, were drenched on the soil at a rate equivalent to 20 ppm of active ingredient by weight of soil. Care was taken to avoid contact with the foliage by any of the treatments. The seedlings were inoculated with conidia of *Erysiphe cichoracearum* and incubated in the greenhouse until untreated plants were completely covered with disease. Disease control readings were made by estimating the percentage of leaf surface free of disease.

TABLE IV

| Compound | Percent Powdery Mildew Control |
|---|---|
| 2-methylamino-3-allyl-6-chloro-4(3H)-quinazolinone | 77 |
| 2-allylamino-3-methyl-6-chloro-4(3H)-quinazolinone | 94 |
| 2-ethylamino-3-methyl-6-chloro-4(3H)-quinazolinone | 99 |
| 2-methylamino-3-methyl-6-chloro-4(3H)-quinazolinone | 98 |
| 2-propylamino-3-methyl-6-chloro-4(3H)-quinazolinone | 100 |
| 2-diethylamino-3-methyl-6-chloro-4(3H)-quinazolinone | 98 |

Formulations

The 2-amino-4(3H)-quinazolinones of this invention can be applied in a variety of formulations, including wettable powders, suspensions, emulsifiable concentrates, dusts, solutions, granules, pellets, etc. High strength compositions may also be prepared for use by local formulators in further processing.

These formulations include one or more compounds of Formula (2), and can include surface-active agents, solid or liquid diluents and other materials as required to produce the desired formulation. Surfactants are present in compositions of this invention in amounts up to about 20 percent by weight based on the total weight of the resulting composition. McCutcheon's "Detergents and Emulsifiers," 1971 Annual, as well as Sisely and Wood, "Encyclopedia of Surface Active Agents," Chemical Publ. CO., Inc., New York, 1964, list surfactants and recommended uses.

Powder and dust preparations can be made by blending the active ingredient, with or without surfactant, with finely divided solids. For wettable powders and high strength compositions, absorptive diluents which aid in grinding and have anti-caking properties are preferred. The major diluent in dusts in preferably dense (such as talcs, pyrophyllite and sericite) to improve ease and accuracy of application.

Typical solid diluents are described in Watkins et al., "Handbook of Insecticide Dust Diluents and Carriers," 2nd Ed. Dorland Books, Caldwell, N.J. 1955.

The particles in dust and powder preparations are preferably less than 50 microns in average diameter. With compounds which are highly water-insoluble, improved activity may be obtained with still finer grinding.

Preferred wettable powder formulations will contain 40 percent or more active ingredient together with sufficient surfactant and inert diluent to permit dispersion in water for spray application. Compositions intended for dust application will generally contain less than 50 percent active ingredient.

Powdered compositions can be converted to granules by adding a liquid, treating mechanically, and usually, drying. Water-soluble binders can be included in these particulate formulations in amounts up to about 25 percent by weight of the finished granule or pellet.

Suspension formulations can be made in water, or in organic liquids, or in mixtures of water and water-miscible organic liquids in which the active ingredient has a solubility of less than about 0.1 percent. Typical liquid diluents and solvents are described in Marsden, "Solvents Guide," 2nd Ed., Interscience, N.Y. 1950. The preparations usually include, in addition to the active ingredient and liquid carrier, surfactants, viscosity control agents, anti-microbial agents and other modifiers. Suspensions in hydrocarbons are suitable for extension in spray oils and, by inclusion of a suitable emulsifying agent, may also be made sprayable from water.

Solution formulations can be prepared in organic solvents. All solution formulations can be used for direct low-volume applications. An important sub-class of solution formulations is emulsifiable concentrates. In these, a water-immiscible solvent is required as well as a surfactant system to help form and stabilize the aqueous emulsion which the ultimate user will prepare for application.

Still another liquid formulation which is particularly convenient for small scale use in the "aerosol" formulation which is packaged under pressure in a suitable container. The active ingredient may be present in a suspension, emulsion or solution.

It is preferred that the active ingredient remain totally dissolved in all solution formulations at 0°C or as low a storage temperature as can be reasonably expected for prolonged periods. In order to insure this, co-solvents, which may be water-miscible even in emulsifiable concentrates, may also be included in the formulations.

The compositions may also include film-forming polymers, humectants, oils and the like which act as spreaders, stickers or penetration aids. Examples of such additives are polyethylene glycols, alkyd resin derivatives, acrylic emulsions, protein colloids, glycerol and the like. In many cases it is preferable to tank-mix these additives.

The compositions of the invention can contain, in addition to the active ingredient of this invention, conventional insecticides, miticides, bactericides, nematicides, fungicides, or other agricultural chemicals such as fruit set agents, fruit-thinning compounds, fertilizer ingredients and the like, so that the compositions can serve useful purposes in addition to the control of fungi and mite infestations.

The additional agricultural chemicals are employed in mixtures or combinations in amounts ranging from one-fifth to twenty times that of the compound or compounds of this invention. The proper choice of amounts is readily made by one skilled in the art of protecting plants from pest depredations.

The use of other pesticides in combination with one or more compounds of this invention sometimes appears to enhance the activity of the active compound of the invention.

Certain typical fungicidal formulations of the present invention are illustrated below. All percentages are by weight.

A. Wettable Powder

| | Percent |
|---|---|
| 2-anilino-3-allyl-6-chloro-4(3H)-quinazolinone | 50 |
| sodium alkylnaphthalenesulfonate | 2 |
| low-viscosity methylcellulose | 2 |
| diatomaceous silica | 46 |

The ingredients are blended, coarsely hammer-milled and then air-milled to produce particles of active essentially all below 20 microns in diameter. The product is reblended before packaging.

All solid compounds of the invention may be formulated similarly.

B. Dust

| | Percent |
|---|---|
| 2-carbethoxyamino-3-allyl-6-chloro-4(3H)-quinazolinone | 10 |
| attapulgite | 10 |
| talc | 80 |

The active ingredient is blended with attapulgite and then passed through a hammer-mill to produce particles of active substantially all below 200 microns. The ground concentrate is then blended with powdered talc until homogeneous.

C. Solution - Granules

| | Percent |
|---|---|
| 2-octylamino-3-allyl-6-bromo-4(3H)-quinazolinone | 40 |
| dimethylformamide | 60 |

The ingredients are combined and stirred with warming to produce a solution. This can be used for low-volume application.

Additionally, this solution may be sprayed onto preformed diatomaceous earth granules (0.6 – 2.5 mm in diameter) tumbling in a rotating drum. The rate of spray is adjusted to produce a 5 percent granule. These are then packaged and are ready for use.

For further information regarding the art of formulation, see, for example:

E. Somers, "Formulation," Chapter 6, in Torgeson, "Fungicides," Vol. I, Academic Press, N.Y., 1967, R. R. Shaffer, U. S. Pat. No. 3,560,616, Feb. 2, 1971, Col. 3, line 48, through Col. 7, line 26.

J. B. Buchanan, U.S. Pat. No. 3,576,834, Apr. 27, 1971, Col. 5, line 36, through Col. 7, line 70.

In the following composition claims, the expression "consisting essentially of " means that, in addition to the components recited in the claims, other components also may be present, provided that they do not adversely affect the operability of the composition for its intended use.

We claim:

1. A 2-aminoquinazolinone having the formula:

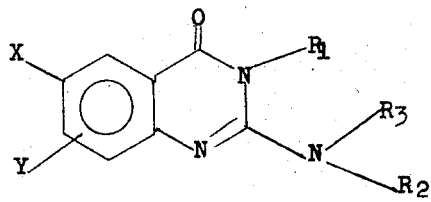

wherein
  $R_1$ is allyl or $C_1$–$C_3$ alkyl;
  $R_2$ is allyl, a $C_1$–$C_6$ alkyl or phenyl;
  $R_3$ is hydrogen;
  X is halogen; and
  Y is hydrogen.

2. 2-Anilino-3-allyl-6-chloro-4(3H)-quinazolinone, the compound of claim 1, wherein $R_1$ is allyl; $R_2$ is phenyl; and X is chlorine.

3. 2-Anilino-3-allyl-6-bromo-4(3H)-quinazolinone, the compound of claim 1, wherein $R_1$ is allyl; $R_2$ is phenyl; and X is bromine.

* * * * *

UNITED STATES PATENT OFFICE
CERTIFICATE OF CORRECTION

Patent No. 3,867,384            Dated February 18, 1975

Inventor(s) Greg A. Bullock and Patrick J. Sheeran

It is certified that error appears in the above-identified patent and that said Letters Patent are hereby corrected as shown below:

On the Cover Sheet, the following should be added:

--[73] Assignee:  E. I. du Pont de Nemours and Company, Wilmington, Delaware. --

Signed and sealed this 15th day of July 1975.

(SEAL)
Attest:

RUTH C. MASON
Attesting Officer

C. MARSHALL DANN
Commissioner of Patents
and Trademarks